(12) United States Patent
Check et al.

(10) Patent No.: US 7,617,410 B2
(45) Date of Patent: Nov. 10, 2009

(54) SIMULTANEOUSLY UPDATING LOGICAL TIME OF DAY (TOD) CLOCKS FOR MULTIPLE CPUS IN RESPONSE TO DETECTING A CARRY AT A PRE-DETERMINED BIT POSITION OF A PHYSICAL CLOCK

(75) Inventors: Mark A. Check, Hopewell Junction, NY (US); Ronald M. Smith, Sr., Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 11/532,168

(22) Filed: Sep. 15, 2006

(65) Prior Publication Data

US 2008/0072097 A1     Mar. 20, 2008

(51) Int. Cl.
  *G06F 1/04*     (2006.01)
  *G06F 11/00*    (2006.01)
(52) U.S. Cl. .................. 713/503; 713/400; 713/500; 368/46; 368/155
(58) Field of Classification Search .............. 713/400, 713/500, 503; 368/46, 155
  See application file for complete search history.

(56) References Cited

U.S. PATENT DOCUMENTS

| | | | | |
|---|---|---|---|---|
| 3,932,847 A | * | 1/1976 | Smith ...................... | 713/400 |
| 5,636,373 A | * | 6/1997 | Glendening et al. ......... | 713/400 |
| 6,591,370 B1 | * | 7/2003 | Lovett et al. ................ | 713/502 |
| 2007/0058491 A1 | * | 3/2007 | Dahlen et al. ................ | 368/46 |
| 2007/0061605 A1 | * | 3/2007 | Engler et al. ................ | 713/500 |
| 2008/0104440 A1 | * | 5/2008 | Engler et al. ................ | 713/500 |
| 2009/0070618 A1 | * | 3/2009 | Dahlen et al. ............... | 713/500 |

\* cited by examiner

*Primary Examiner*—Mark Connolly
(74) *Attorney, Agent, or Firm*—Scully, Scott, Murphy & Presser, P.C.; John E. Campbell (57) ABSTRACT

A system, method and computer program product for synchronizing adjustment of a time of day (TOD) clock for a computer system having multiple CPUs, each CPU having an associated physical clock providing a time base for executing operations that is stepping to a common oscillator, and an associated logical TOD clock. The method includes detecting propagation of a carry at a pre-determined bit position of the physical clock associated with a CPU in the computer system; and, updating, in response to the detecting of the pre-determined bit position carry, a TOD-clock offset value (d) to be added to a physical clock value (Tr) value to obtain a logical TOD clock value (Tb) for use by a CPU in the system. In this manner, each CPU computes a new logical TOD clock value in synchronization—the new logical TOD clock value taking effect simultaneously for the multiple CPUs.

33 Claims, 6 Drawing Sheets

Old- Episode Start Time (old.s)

Old- Episode Base Offset (old.b)

OEFS Rate (old.f)

OEGS Rate (old.g)

New-Episode Start Time (new.s)

New-Episode Base Offset (new.b)

NEFS Rate (new.f)

NEGS Rate (new.g)

Current Start Time (s)

Current Base Offset (b)

C Fine S Rate (f)

C Gross S Rate (g)

C Total S Rate (r)

TOD Offset (d)

```
LoopC1
t1 ← Tr[0:41]||z(22)   ─── 210
SCB1 ← SCB
i ← SCB1 [56:63]
If t1 < SDB.i.new.s Then
    s ← SDB.i.old.s
    b ← SDB.i.old.b
    f ← SDB.i.old.f
    g ← SDB.i.old.g              ⎫
Else                              ⎬ 220
    s ← SDB.i.new.s              ⎭
    b ← SDB.i.new.b
    f ← SDB.i.new.f
    g ← SDB.i.new.g
EndIf
SCB2 ← SCB
If SCB2 = SCB1 Goto LoopC1
r ← (f + g)[0:31]
If r ≠ 0 Then
    u ← (t1 - s)[0:63]
    w ← z(12)||u[0:41]||z(10)
    m ← abs(r)[0:31]
    p ← (w·m)[0:95]
    q ← p[0:63]
EndIf
If r > 0 Then
    dc ← (b + q)[0:63]   ─── 225a
EndIf
If r = 0 Then
    dc ← b               ─── 225b
EndIf
If r < 0 Then
    dc ← (b - q)[0:63]   ─── 225c
EndIf
Exit Sub
```

```
          LoopD1
          C42 ← 0          ─305
          Call ccep  ─310
          d ← dc           ─312
 315─
     └─If sie > 0 Then
              LoopD2
              t3 ← Tr[0:57]||z(6)
      320─
          └─Tp ← (t3 + d + sd1.ed)[0:63]   ⎫
              t4 ← Tr[0:57]||z(6)           ⎬ 325
              If t4 > t3 Goto LoopD2        ⎭
 330─ EndIf
     └─If sie > 1 Then
              LoopD3
      335─    t5 ← Tp[0:57]||z(6)
          └─Tv ← (t5 + sd2.ed)[0:63]   ⎫
              t6 ← Tp[0:57]||z(6)       ⎬ 340
              If t6 > t5 Goto LoopD3    ⎭
          EndIf
375  345─ LoopD4
     346─ wl ← Tr[42:57]             ⎫
          wr ← (-r)[0:3]              ⎬ 350
     349─ If wl ≤ wr Goto LoopD4     ⎭
          t2 ← Tr[0:41]||z(22)
          If t2 > t1 Goto LoopD1
          Exit Sub
```

FIG. 7

SIMULTANEOUSLY UPDATING LOGICAL TIME OF DAY (TOD) CLOCKS FOR MULTIPLE CPUS IN RESPONSE TO DETECTING A CARRY AT A PRE-DETERMINED BIT POSITION OF A PHYSICAL CLOCK

CROSS-REFERENCE TO RELATED APPLICATIONS

The present application relates to commonly-owned, co-pending U.S. patent application Ser. No. 11/223,886 which was filed on Sep. 9, 2005, the whole contents and disclosure of which is incorporated by reference as if fully set forth herein.

BACKGROUND OF THE INVENTION

1. Field of the Invention

The present invention relates generally to timing signals in computer systems, and particularly, to a system and method for synchronizing the adjustment of the Time-Of-Day (TOD) clock in computer systems for enhanced timing precision.

2. Description of the Prior Art

To provide for system integrity and data recovery in computer systems, mainframe server devices such as the zSeries® eServer® available from assignee International Business Machines, Inc., uses the concept of a universal timestamp. Each time a data base record is updated, a recovery record is also created. The recovery record includes a timestamp obtained while the data-base record was locked. The remaining information in the recovery record is sufficient to recover the data-base record, provided the recovery records from all recovery-record data sets for all threads are sorted in sequence using the timestamps. This requires that all TOD clocks in the sysplex must have the same time.

In the past, the TOD clocks in the timing network were synchronized by means of an external box, the 9037 sysplex timer. Each Central Processing Complex (CPC) in the 9037 timing network stepped its TOD clock to the common stepping signals from the 9037. The stepping signals broadcast by the 9037 required special point-to-point links (called External Time Reference (ETR) links) from the 9037 to each CPC. Accurate communication of the stepping signals on the ETR links required a special protocol at the logical and physical signal levels that was different from any other communication protocol. A representative system implementing ETR offset values for synchronizing logical partitions of a logically partitioned machine is described in commonly-owned U.S. Pat. No. 6,209,106.

Current clock synchronization solutions address synchronization of clocks (usually separated by a significant distance) that are stepping at slightly different rates (each clock has a local oscillator). These solutions for synchronization of clocks require a two part action: 1) detecting the difference (or error) between the clocks; and, 2) making an adjustment to the oscillator frequency or stepping rate as a function of the error.

For systems that implement a timing solution that does not include a common stepping signal, timing information is communicated by means of messages with time stamps and other timing information, and each CPC must keep its TOD clock in step with the rest of the other CPCs by computing offsets and taking action to adjust TOD clock. This is similar to the action performed by NTP (Network Timing Protocol), the difference being that NTP is normally implemented in a software layer where time stamps can be generated by the control program. The eServer zSeries® architecture however, has very stringent requirements on the TOD clock; it can be viewed by any problem program, all timestamps must be different, timestamps must never appear to step backwards, and timestamps must appear to be increasing, even when viewed by programs running on different CPUs in the CPC. To make the adjustments to the TOD clock required by the new timing solution, the stepping rate of the TOD clock must be speeded up or slowed down by very fine adjustments, and these adjustments must by observed simultaneously by all CPUs in the CPC. This is critical due to the fact that the time between stepping pulses to the rightmost bit of the TOD clock is comparable to the cache-to-cache transfer time between CPUs. Thus, changing the TOD as viewed by one CPU by the smallest value possible can result in the TOD clock no longer meeting the architecture requirements for the TOD clock as viewed by other CPUs in the CPC.

The zSeries® architecture requires that the TOD clock appears as a single register in the central processing complex. For performance reasons, however, there is a separate slave clock in each CPU. Special hardware, along with special millicode, is provided to synchronize all slave clocks. Without TOD-clock steering, the slave clock is used directly as the TOD-clock value. With TOD-clock steering, an offset must be added to the slave clock to obtain the TOD-clock value. The offset changes approximately every millisecond. Each time the offset changes, this change must be reflected simultaneously to all CPUs in the CPC. In addition, a new episode may take effect approximately once every second. Episode changes must also be reflected to all CPUs in the CPC. There currently is no mechanism in the machine capable of communicating these changes to all CPUs at the exact same instant in time.

It would be desirable to provide a system and method for synchronizing the adjustment of a slave TOD clock-offset value for all slave clocks in a tightly coupled shared storage multiprocessing environment comprising multiple CPUs that implement TOD-clock steering.

It would be further desirable to provide a system and method for synchronizing the adjustment of a slave TOD clock-offset value for all slave clocks in a tightly coupled shared storage multiprocessing environment comprising multiple CPUs, wherein each CPU is enabled to perform the TOD clock-offset value update with no interference between CPUs, provided a new episode in not in the process of being scheduled.

It would be further desirable to provide a system and method for synchronizing the adjustment of a slave TOD clock-offset value for all slave clocks in a tightly coupled shared storage multiprocessing environment comprising multiple CPUs, wherein a mechanism is provided to ensure that the CPU scheduling a new episode exclusively holds the cache line containing the episode parameters.

SUMMARY OF THE INVENTION

The present invention provides novel methods for synchronization of TOD-cock offset value updates and scheduling new episodes, apparatus and computer program product for mainframe server architectures having a tightly coupled shared storage multiprocessing environment.

In the system and method for synchronizing the adjustment of a slave TOD clock-offset value for all slave clocks in a tightly coupled shared storage multiprocessing environment comprising multiple CPUs, each CPU is enabled to perform the TOD clock-offset value update. Furthermore, a mechanism is provided to ensure that the CPU scheduling a new episode exclusively holds the cache line containing the episode parameters.

The TOD-clock steering methodology implements old and new episode parameters that are maintained in a hardware storage area (HSA) and changes to the episode parameters are scheduled to take place synchronized with the carry out from one bit position (n) to a second bit position (n−1).

In one embodiment, the synchronization of the TOD-clock offset value update is a result of the TOD-clock synchronizing with the carry of bit position 42 into bit position 41 by the slave clock comprising the TOD value for each CPU of the CPC. In this regard, a special circuit is added to each slave clock to detect that carry out of the first bit position (e.g., bit 42) into bit position (e.g., bit 41) of the slave clock. The occurrence of the carry causes a latch to be set which latch can then be examined and reset by the millicode.

Whenever the TOD clock is to be used by the system, before using the value, the millicode tests the hardware latch. If the latch is set, then the millicode resets the latch and accesses the HSA location to obtain the current values of the episode parameters.

To change the episode parameters, the millicode in the CPU performing the update must ensure that the cache line containing the episode parameters is held exclusively by the CPU. There is always the possibility that a carry may occur out of the first bit position of the TOD clock (e.g., bit 42) into the second bit position (e.g., bit 41) of the slave clock during the update. If the cache line were not held exclusive, another CPU could fetch the old values after the carry and before the update.

Thus, according to one aspect of the invention, there is provided a system, method and computer program product for adjusting a logical time of day (TOD)-clock for a computer system having multiple CPUs, each CPU having an associated physical clock providing a time base for executing operations that is stepping to a common oscillator, and an associated logical TOD clock, the method comprising:

detecting propagation of a carry at a pre-determined bit position of the physical clock associated with a CPU in the computer system; and, updating, in response to the detecting of the pre-determined bit position carry, a TOD-clock offset value (d) to be added to a physical clock value (Tr) to obtain a logical TOD clock value (Tb) for use by a CPU in the systems wherein each CPU computes a new logical TOD clock value in synchronization, the new logical TOD clock value taking effect simultaneously for the multiple CPUs.

Further to the method, the detecting a carry comprises:

setting a latch device associated with a physical clock of a CPU in the computer system, the latch device being set in response to the carry of a pre-determined bit position of the physical clock.

Further to the method, each CPU of the system is enabled access to a shared storage means, the storage means including a storage location for storing the episode parameters used to compute a current updated TOD-clock offset value (d).

Further to the method, a CPU is enabled to atomically update the episode parameters stored at the storage location, the method further comprising:

ensuring a CPU has exclusive ownership of the storage location prior to initiating an atomic update of the episode parameters stored thereat.

Further to the method, the storage location comprises a cache line in a shared memory storage device, the ensuring exclusive CPU ownership of the storage location comprising: maintaining a state of the cache line. The cache line state comprises one of: a free state where the cache line is not in use by any other CPU, a shared state where one or more CPUs enjoys read only access, or an exclusive state where only one CPU enjoys read and write access.

Further to the method, the updating of a TOD-clock offset value (d) further comprises: re-setting the latch device in preparation for a next pre-determined bit position carry.

Further to the method, the updating of a TOD-clock offset value (d) further comprises:

computing current episode parameters including a current total TOD clock steering rate (r); and, providing the time at the most recent TOD-offset-update event (t1) and the current offset value for the time t1 which current offset value is used to update the TOD-offset register (d).

Further to the method, the updating of a TOD-clock offset value (d) further comprises:

tracking the time elapsed (w1) since the latch device was set; and, comparing a negative value (wr) of the current total TOD clock steering rate (r) against the elapsed time value w1; and, delaying time elapsed for the TOD-clock offset adjust process to prevent the appearance of the logical TOD clock stepping backwards when w1≦wr.

Further to the method, the logical TOD clock value change is monotonically increasing, the CPU delaying use of the new logical TOD clock value by at least the amount of the negative change.

Furthermore, the method avoids a further carry propagating at the predetermined bit position of the physical clock in the time it takes to atomically update the TOD-clock offset register (d).

Advantageously, the apparatus and method of the invention: 1) provides that all physical clocks are stepping to a common oscillator and are synchronized; 2) provides a hardware-generated signal to indicate the occurrence of a TOD offset update event. In the exemplary embodiment, this is triggered by a "carry" out of a bit position of the physical clock in each CPU; 3) communicates the current steering parameters to all CPUs. This is preferably accomplished by shared storage with interlocked update to change steering parameters and read-only access by all processors to minimize the overhead; and, 4) it implements a mathematical formula to compute a digital value to update the offset and be applied at precise instants of time. The mathematical formula is such that it ensures that no value is lost, even if the CPU goes to sleep for a long time.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF PREFERRED EMBODIMENT

The present invention relates to commonly-owned, co-pending U.S. patent application Ser. No. 11/223,886 which was filed on Sep. 9, 2005 entitled SYSTEM AND METHOD FOR TOD-CLOCK STEERING, the contents and disclosure of which is incorporated by reference as if fully set forth herein. Co-pending U.S. patent application Ser. No. 11/223, 886 relates to a Time-Of-Day (TOD) clock steering method and apparatus for mainframe server architectures having a tightly coupled shared storage multiprocessing environment (CPCs) where all physical clocks are already synchronized by means of a common oscillator stepping pulse.

Figure 1:
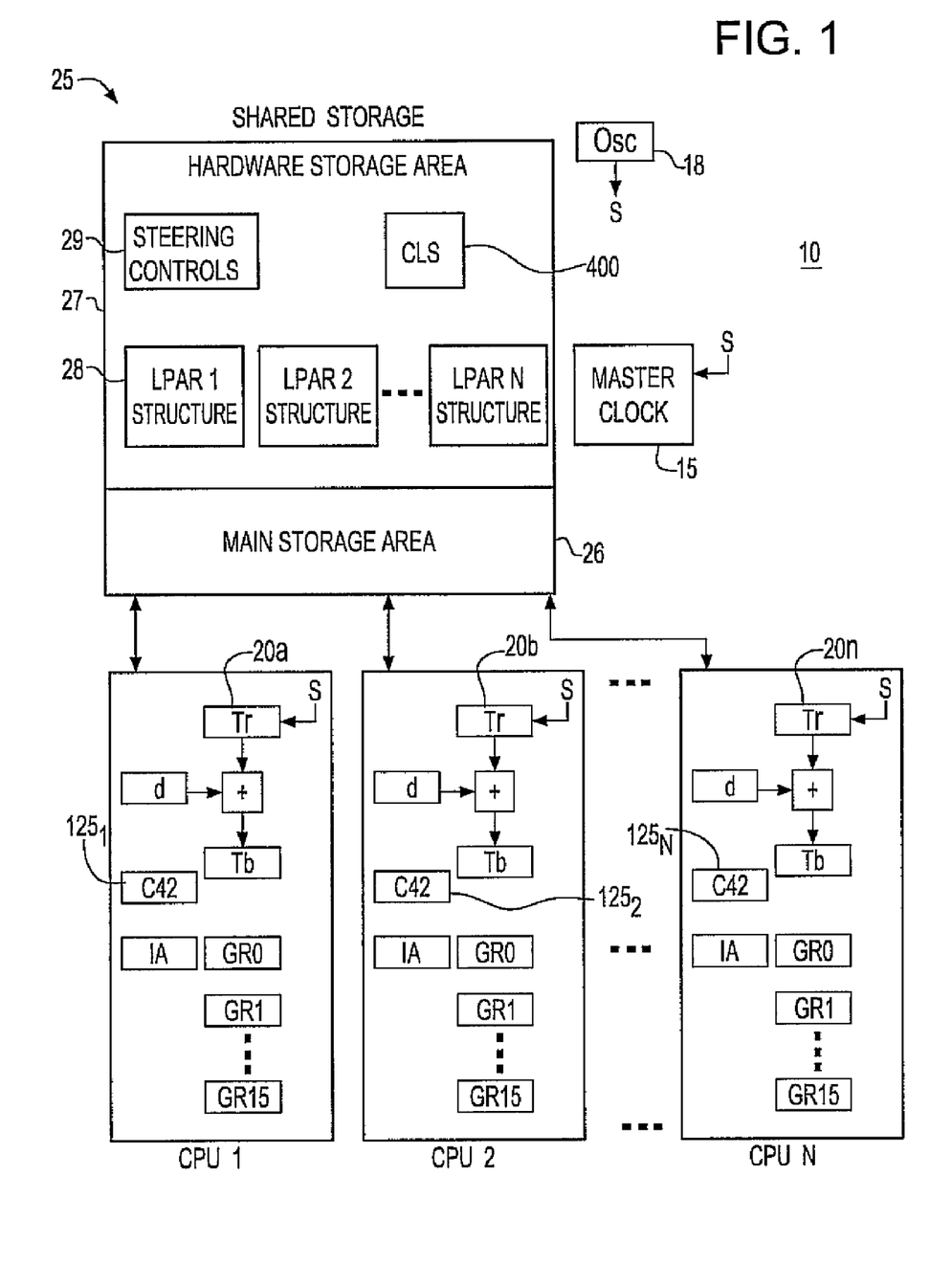
FIG. 1 is a diagram depicting the system 10 in which the present invention is implemented.

FIG. 1 is a diagram depicting an exemplary system 10 in which the present invention is implemented. The system 10 depicts a zSeries® eServer or like server architecture including a Central Processing Complex (CPC) having multiple CPUs labeled CPU_1, CPU_2, . . . , CPU_N. The CPC has a master clock 15 and each CPU has a slave (physical) clock $20a, 20b, \ldots, 20n$. The slave physical clocks are set to the same value as the master clock by means well known in the art. The master clock 15 and all slave physical clocks $20a, 20b, \ldots, 20n$ are stepped by the same stepping signal (labeled "s") generated by oscillator 18. In one illustrative embodiment, in addition to the Slave Physical Clock (labeled "Tr"), each CPU also has an Offset Register (labeled "d"), a Basic Machine Logical TOD Clock (labeled "Tb"), an instruction address register (labeled "IA"), and 16 general registers (labeled GR0-GR15). As shown, each of the CPU_1, CPU_2, . . . , CPU_N share a common storage device 25 including a main storage area 26 which is available to a program and a hardware storage area 27 that is a small portion carved out to be used "under the covers" for subchannel information, CPU-to-CPU communication, crypto buffer queues, measurement information, etc. Maintained by the storage subsystem is a cache line state (CLS) 400, the details of which is described in greater detail with respect to FIG. 6.

As known, the CPC is adapted for logical partitioning which allows the establishment of a plurality of system images within the single CPC. Logical partitioning (LPAR) structures 28 are shown in FIG. 1, representing each system image that is capable of operating as if it were a separate computer system and can be independently reset, loaded with an operating system (different for each logical partition, and operate with different software programs using different I/O devices. Moreover, each partition has its own logical partition clock "Tp" as described in greater detail with reference to FIG. 2. Each LPAR structure shown in FIG. 1 is logically represented by a state description including all the information to specify the registers (PSW, GRs, FPRs, etc.) the storage area to be used, and the controls for interception for the LPAR. With the advent of LPAR only systems, the hardware storage area 27 is the part of shared storage used for the LPAR hypervisor. Additionally shown in the system of FIG. 1 are steering controls 29 including "Steering Parametersr" for storing clock steering values including, but not limited to: Old-Episode Start Time (old.s), Old-Episode Base Offset (old.b), Old-Episode Fine Steering (old.f), Old-Episode Gross Steering (old.g), New-Episode Start Time (new.s), New-Episode Base Offset (new.b), New-Episode Fine Steering (new.f), and, New-Episode Gross Steering (new.g). These steering parameters will be described in further detail herein in connection with FIG. 2. Further shown in FIG. 1, associated with each $CPU_1, \ldots, CPU_N$ is a respective latch device $125_1, \ldots, 125_N$ that is tested by millicode (depicted as the pseudo-code for TOD-Offset-Update Event (todup) Subroutine) executing at the CPU, as will be described in greater detail herein with respect to FIG. 7.

Co-pending U.S. patent application Ser. No. 11/223,886, describes how TOD-clock steering provides a means to change the apparent stepping rate of the TOD clock Tb without changing the physical hardware oscillator which steps the physical clock Tr. This is accomplished by means of the TOD-offset register (d) which value is added to the physical clock Tr to produce a logical-TOD-clock value.

The TOD-offset register value (d) nominally consists of bits, e.g., bits 0-95, which are updated approximately every microsecond by adding a 32-bit signed value, called the current total steering rate (r), aligned with bits 64-95 of the TOD-offset register. A carry, if any, out of bit position 0 of the TOD-offset register is ignored in this addition. In models having a higher or lower resolution, the addition is performed at such a frequency, and with (r) appropriately aligned, that the rate of changing the TOD-offset register is the same as if (r) were added to bit positions 64-95 every microsecond.

It is understood that for some server (CPC) architectures, the TOD-offset register value (d) may be less than 64 bits and is updated periodically using a mathematical formula. The mathematical formula produces a result that is equivalent to the nominal rate, and is designed such that updates are never lost, even in the case when the machine operation is suspended for long periods of time. In normal operation, the update is performed frequently enough that the effect, as observed by the program, is indistinguishable from a uniform stepping rate.

As mentioned, in accordance with co-pending U.S. patent application Ser. No. 11/223,886, TOD-clock steering permits the timing-facility control program to adjust the apparent stepping rate of the TOD clock. The stepping rate can be adjusted up to about ±122 parts per million (ppm) with precision to one part in $2^{44}$ (about 4.9 nanoseconds per day). The stepping rate can be changed in a non-disruptive manner; that is, application programs may be running in the configuration when the change is made, with an almost imperceptible effect on the programs.

The total steering rate is made up of two components, a fine-steering rate and a gross-steering rate. The fine-steering rate is used to correct that inaccuracy in the local oscillator that is stable over a relatively long period of time. The value will normally be less than the specified tolerance of the local oscillator (typically ±2.0 ppm), changes will occur infrequently (on the order of once per day to once per week), and changes will be small (typically less than ±0.2 ppm).

The gross-steering rate is used as a dynamic correction for all other effects, the most predominate being to synchronize time with an external time source and with other clocks in the timing network. The value will normally change frequently (on the order of once per second to once per minute); and the value may range up to more than ±10 ppm.

While the fine-steering rate and gross-steering rate are used by the timing facility control program for different purposes, these components are treated interchangeably in the clock adjustment algorithm. The 32-bit fine-steering rate (f) is added to the 32-bit gross-steering rate (g) to form a 32-bit current total steering rate (r); a carry, if any, out of bit position 0, is ignored in this addition. TOD-clock steering includes four control functions which are issued by the timing-facility-control program: 1) set fine-steering rate; 2) set gross-steering rate; 3) adjust TOD-offset; and 4) set TOD-offset. The set-fine-steering-rate and set-gross-steering-rate functions operate on the fine-steering-rate and gross-steering-rate registers, respectively, and can be issued without causing any discontinuity in the logical TOD clock. These functions are available only to the timing-facility-control program; however, may be used by test programs running in a logical partition with special authorization.

When the level of interpretive execution is at the basic-machine level, indicated by a parameter "sie" set equal to zero, i.e., sie=0, the set-TOD-offset and adjust-TOD-offset functions permit the logical TOD clock (Tb) to be set to any arbitrary value, but with a discontinuity. These functions are to be used by the timing-facility-control program only for initialization, testing, and in extreme error situations. When operating at the logical-partition level with a parameter "sie" set equal to one, i.e., sie=1, and when operating at the virtual machine level with a parameter "sie" set equal to two, i.e., sie=2, the set-TOD-offset function, when issued in the supervisor state, causes an interception and the function to set the TOD epoch difference in the state description to the requested value, may be emulated by the hypervisor. For programs running in a logical partition (sie=1) with special authorization, the set-TOD-offset and adjust-TOD-offset functions target different registers. The set-TOD-offset function is emulated by the hypervisor and operates on the TOD epoch difference as described above. The adjust-TOD-offset function operates on the TOD-offset register, and is performed by the machine without interception.

Figure 2:
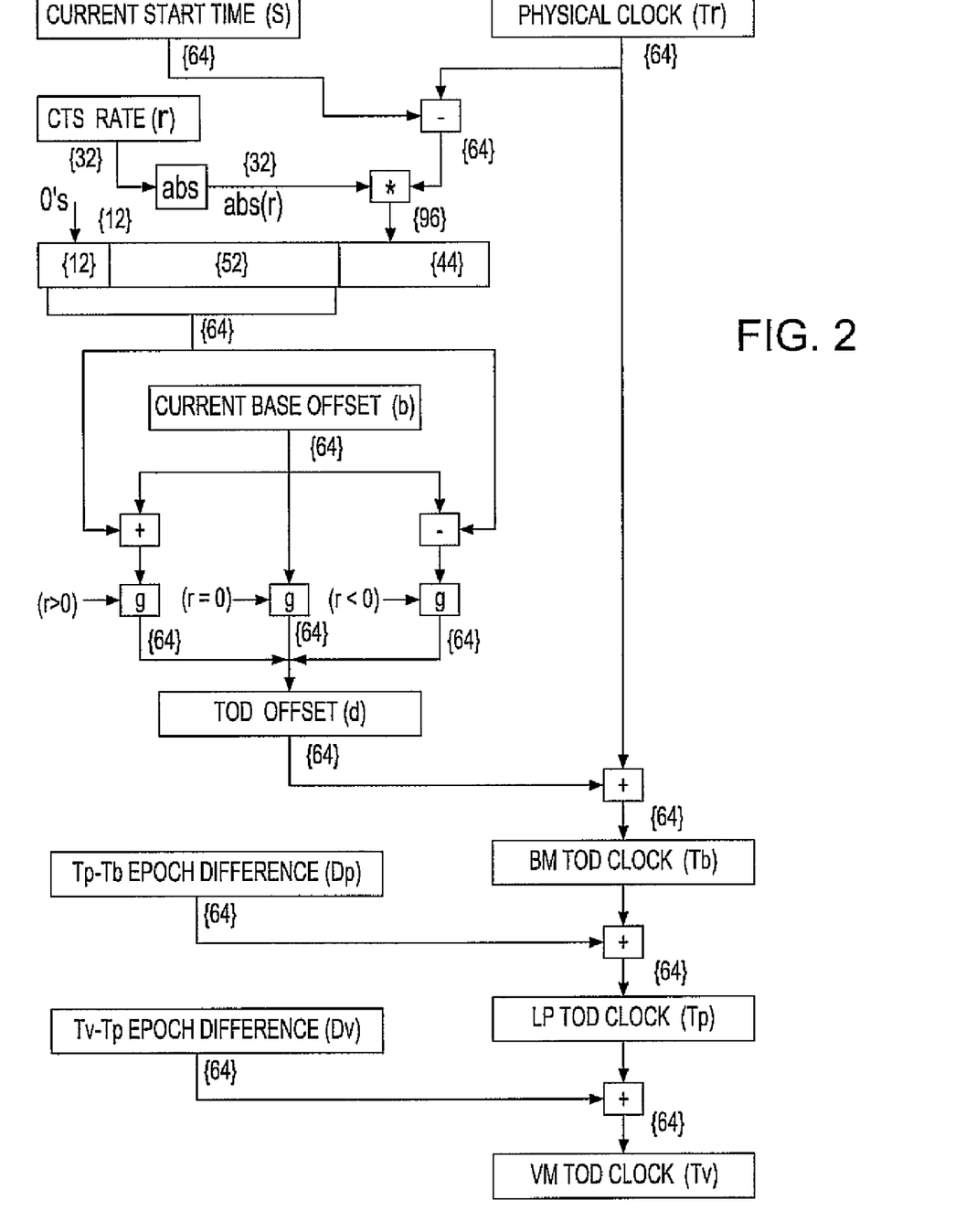
FIG. 2 depicts an overview of the TOD-clock operation as implemented in accordance with the invention.

FIG. 2 depicts an overview of the TOD-clock operation, including steering. TOD-clock steering is accomplished by means of three values; a start time (s), a base offset (b), and a steering rate (r). These three values are used to compute a TOD offset (d) which is added to the physical clock (Tr) to form the basic-machine TOD clock (Tb). The start time (s) and base offset (b) are 64-bit unsigned binary integers and are considered to be aligned with bits 0-63 of the TOD clock. The steering rate is a 32-bit signed binary fixed-point value and considered to be scaled by a factor of $2^{-44}$ according to one embodiment of the invention. The following formulae show the derivation of the TOD offset (d) and basic-machine TOD clock (Tb) from the physical clock (Tr), current start time (s), current base offset (b), and current total steering rate (r);

$$d=b+(Tr-s)\cdot r\cdot 2^{-44}$$

$$Tb=Tr+d$$

Steering is also applied to the logical-partition TOD clock (Tp) and the virtual-machine TOD clock (Tv) as shown in FIG. 2.

In operation, rather than being computed continuously, the TOD offset (d) is updated periodically. This update, referred to herein as a TOD-clock offset-update event, is triggered by the carry out of a bit position of the physical clock. The bit position depends on the model, but is chosen such that for normal steering rates, the difference between the values computed for the TOD offset (d) by consecutive TOD-offset-update events is less than the resolution of the TOD clock.

The three values, s, b, and r, define a linear steering adjustment that can be applied indefinitely. The duration that these values are applied without being changed is called an episode. Whenever the timing-facility-control program requests a change to the steering rate, the machine schedules a new episode to take effect at a future time. To provide a smooth transition, the machine schedules the start time for the new episode to be at the next TOD-offset-update event and computes a new base offset such that there will be no discontinuity in the value of the TOD offset at the instant the new values take effect.

The machine places the new values into fields called new-episode start time (new.s), new-episode base offset (new.b), new-episode fine-steering rate (new.f); and new-episode gross-steering rate (new.g); and the previous contents of these four fields are preserved by placing them into fields called old-episode start time (old.s), old-episode base offset (old.b), old-episode fine-steering rate (old.f), and old-episode gross-steering rate (old.g), respectively. The machine continues to use the values for the old episode until the physical clock reaches the new-episode start time (new.s) and then automatically switches to use the values for the new episode. The values in use at any particular instant in time are called current start time (s), current base offset (b), and current total steering rate (r). These are collectively referred to as the current-episode values.

Figure 3A:
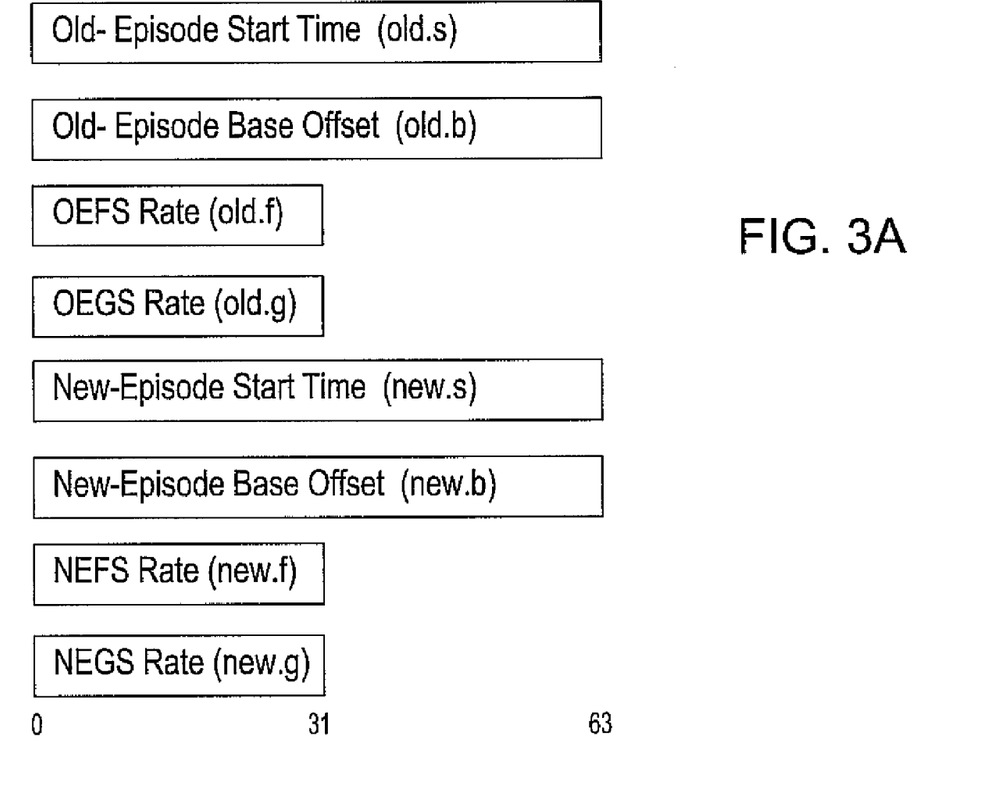
FIG. 3A provides a summary of Steering Parameters in HSA implemented in accordance with the invention.
Figure 3B:
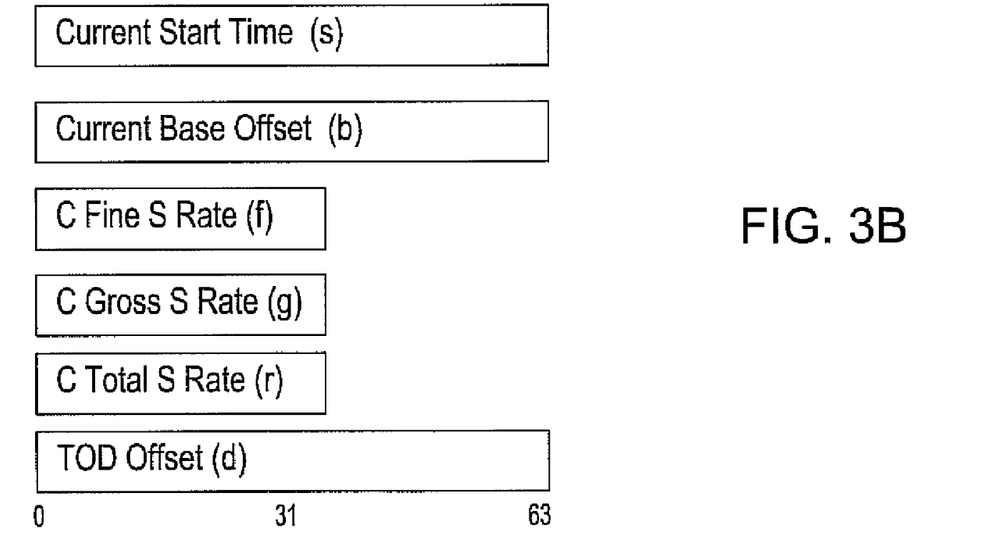
FIG. 3B provides a summary of Steering Registers in Each CPU implemented in accordance with the invention.

FIGS. 3A and 3B summarize the TOD-clock-steering registers and their corresponding bit values. The contents of all TOD-clock-steering registers are initialized to zero by power-on reset.

Current Start Time (s)

When the machine is operating in the old episode, the current start time is obtained from the old-episode start time (old.s); and when in the new episode, it is obtained from the new-episode start time (new.s). The current start time (s) is a 64-bit unsigned binary integer and is considered to be aligned with bits 0-63 of the TOD clock. In the calculation of the steering adjustment, the current start time (s) is subtracted from the value of the physical clock (Tr) to form a 64-bit unsigned difference (Tr−s). A borrow (or carry) out of bit position 0 is ignored during this subtraction.

Current Base Offset (b)

When the machine is operating in the old episode, the current base offset is obtained from the old-episode base offset (old.b); and when in the new episode, it is obtained from the new-episode base offset (new.b). The current base offset (b) is a 64-bit unsigned binary integer and is considered to be aligned with bits 0-63 of the TOD clock.

Current Steering Rates (f,g,r)

When the machine is operating in the old episode, the current fine-steering rate (f) and current gross-steering rate (g) are obtained from the old-episode fine-steering rate (old.f) and gross-steering rate (old.g), respectively; when in the new episode, they are obtained from the new-episode fine-steering rate (new.f) and gross-steering rate (new.g), respectively. The current total steering rate (r) is obtained from the sum of the current fine-steering rate (f) and the current gross-steering rate (g). A carry, if any, out of bit position 0, is ignored in this addition. The current total steering rate (r) is a 32-bit signed binary fixed-point value and considered to be scaled by a factor of $2^{-44}$ according to one embodiment of the invention. The absolute value of (r), treated as a 32-bit binary unsigned number is multiplied by the 64-bit unsigned difference (Tr−s) to form a 96-bit unsigned binary product, which is shifted right by 44 bit positions to form a 52-bit intermediate result. Twelve zeros are then appended on the left to form a 64-bit adjustment value. If r is zero (r=0), the current base offset is used directly as the TOD offset and no multiplication is necessary. If r is positive (r>0), the adjustment value is added to the current base offset (b) to form the TOD offset (d); if r is negative (r<0), the adjustment value is subtracted from the current base offset (b) to form the TOD offset (d). A carry, (or borrow) occurring during this addition (or subtraction) is ignored. When r is negative, then each time an TOD-offset-update event occurs within a single episode, after computing the current TOD offset (d), the machine provides an interlock by delaying long enough to ensure that the logical TOD clock appears to step forwards as viewed by the program.

It should be understood that bits 0 and 31 of the steering-rate represent steering rates of $-2^{-13}$ and $2^{-44}$ respectively. Thus, steering rates of ±122 parts per million (10.5 seconds per day) may be specified with a precision of 4.9 nanoseconds per day.

TOD Offset (d)

The TOD offset is a 64-bit value aligned with bits 0-63 of the TOD clock. The contents of the TOD offset, treated as a 64-bit unsigned binary value are added to the physical clock to obtain the basic-machine TOD clock. A carry, if any, out of bit position 0, is ignored in this addition. Depending on the model, rightmost bits of the TOD offset corresponding to bits beyond the resolution of the TOD clock may not be implemented and are treated as zeros.

TOD-Clock Steering Implementation

The steering parameters must be updated using an interlock mechanism that does not require write accesses by the read-only operations. This is essential to the implementation, especially for the TOD-offset-update event described in greater detail herein below. This event occurs simultaneously on every CPU in the configuration every 1024 microseconds and the overhead, if each CPU attempted to lock the information, would be prohibitive.

The classical model for atomic updates is to use a lock bit. To operate properly, routines reading the steering parameters must test the lock bit, and, if set, must loop waiting for the lock hit to be reset. If the processor performing an update is delayed, hangs up, or stops, other processors waiting to read or update the information must loop. This is called a loop-while-locked (LWL) algorithm. It has the characteristic that without special handling (sometimes called lock recovery) a program may loop forever waiting for the lock bit to be turned off. This is a particularly serious problem in the case of the steering parameters, as all CPUs in the configuration must read this information every 1024 microseconds, for example.

According to an exemplary implementation of the invention, the pseudo code for updates of the steering parameters is based on an algorithm in which a routine loops only if a change occurs. If the processor performing an update is delayed, hangs up, stops, or enters the check-stop state, no changes are occurring and the other processors in the system can continue. This is called a loop-only-if-changed (LOC) algorithm. A LOC routine loops only if an update actually completes during the execution of this routine and looping continues only as long as updates continue to complete.

The loop-only-if-changed (LOC) algorithms are based on the use of multiple steering-interface-data blocks (SDBs) and a single steering-interface-control block (SCB). Each SDB is identified by an index, and can be in one of three states: free, draft, or sanctioned. At any instant, one and only one SDB is sanctioned. The SCB includes the index of the sanctioned SDB and a sequence count. An LOC update routine obtains an SDB in the free state, places it in the draft state, places the updated information into the draft SDB, and requests that the draft SDB be sanctioned. The sanctioning process is performed by updating the sequence count and index fields in the SCB as a single atomic update. If the sanctioning process is successful, the previously sanctioned SDB is then placed in the free state. This portion of the operation need not be performed as part of the atomic interlocked update.

Since a critical portion of this update can be performed as a compare-and-swap type interlocked update, lock recovery is removed from the main-stream operation.

In the rare event that multiple updates are attempted concurrently, multiple SDBs will be in the draft state, but only one of these updates will be completed successfully. The other update routines are notified that the sanctioning process was not successful. Thus, update routines may loop in the same manner that LOC read routines loop when a change occurs. Note that the sequence when contention occurs is not FIFO (first-in-first-out) and not LIFO (last-in-first-out), but first-out-only-out. As will be described in greater detail herein below, the pseudo-code for the LOC update routines is based on two subroutines Get SDB (gsdb) and Promote SDB (psdb) and a 64-bit steering control block (SCB) which includes a 56-bit sequence number and an 8-bit index. In the actual implementation, the SCB could be fewer bits.

Conceptually, bits 0:31 of the current total steering rate (r) are added into bits 64:95 of an extension to the TOD offset (d) once every microsecond (that is, each time a carry occurs out of bit position 52 into bit position 51 of the physical clock). The external architecture permits an implementation to perform this update less frequently by using the carry from a different position of the physical clock, with appropriate alignment for the addition, provided the resulting effect is essentially the same. Specifically, while the bit position depends on the model, the architecture requires that, for normal steering rates, the difference between the values computed for the TOD offset (d) by consecutive TOD-offset-update events is less than the resolution of the TOD clock."

In one example server implementation, the TOD clock resolution is at bit position 57 and the TOD-offset-update event is triggered by a carry into bit position 41. Thus, the architecture requirement is met, provided the normal steering rate is less than 16 ppm, for example. Since the oscillator for exemplary server implementation is specified to be ±2 ppm, normal steering rates should be much less than 16 ppm. Thus, in the embodiment described, the carry out of bit 42 of the physical clock is used. A carry is propagated out of bit position 42 into bit position 41 of the physical clock every 1024 microseconds, or approximately every millisecond. Updating the steering parameters is implemented around the occurrence of this carry.

Figure 4:
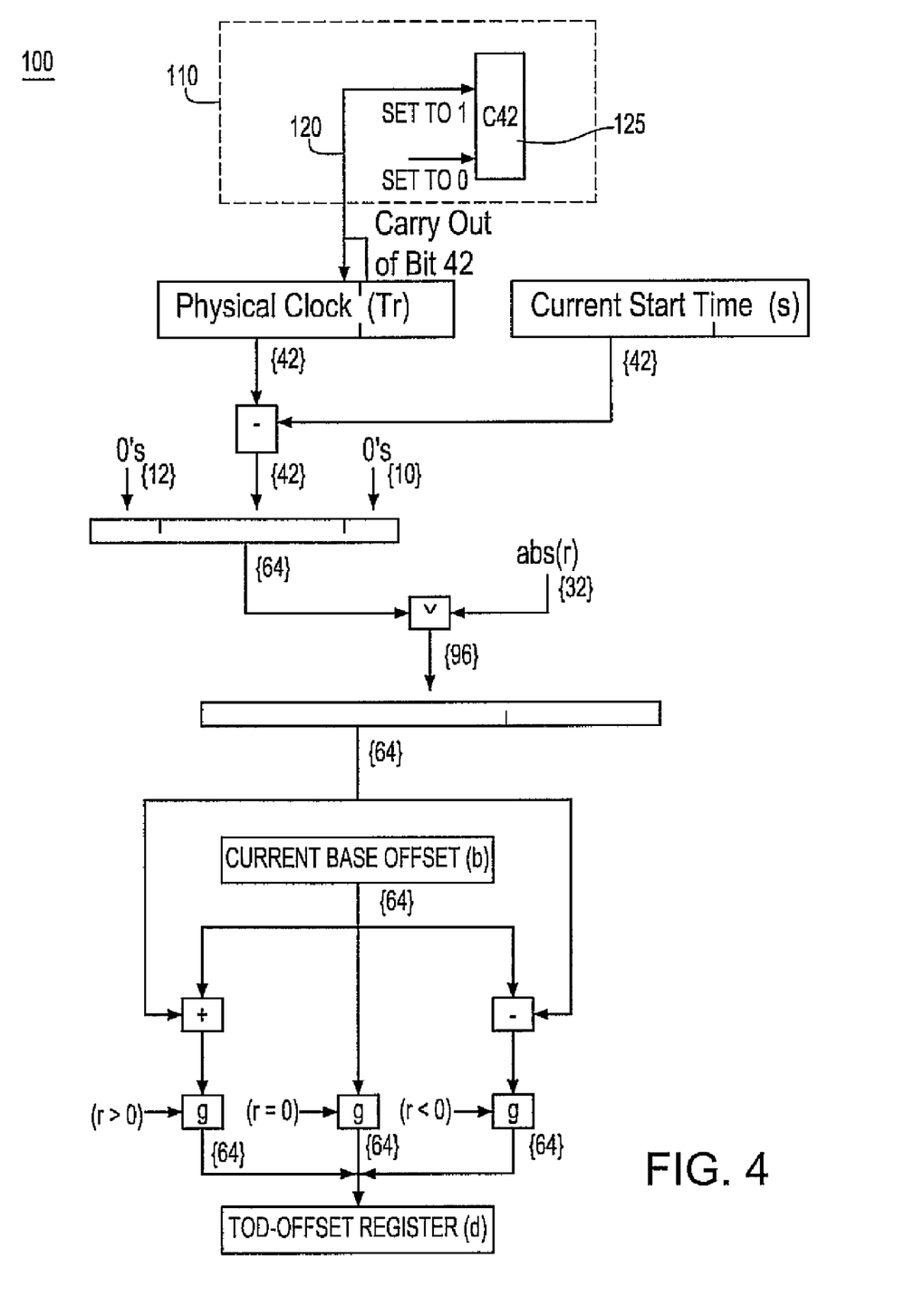
FIG. 4 illustrates implementation details to update the TOD-offset register in accordance with the invention.

FIG. 4 depicts the implementation details to update the TOD-offset register (d). As shown in FIG. 4, for the example implementation 100 for updating the TOD-offset register, each time a carry is propagated out of bit position 42 into bit position 41 of the physical (slave) clock, before using any logical TOD clock, the TOD-offset value (d) stored in a register must be updated from the steering parameters in HSA. As shown in FIG. 4, a circuit 110 is added to each slave clock to detect the carry out signal 115 of bit 42 into bit 41 of the slave clock labeled in FIG. 4 as the "Carry Out of Bit 42" signal 120. The signal 120 from this circuit is shown as going into bit 41 (the normal carry) and is additionally used elsewhere in the system. For example, this signal is input to a latch 125 labeled as latch "C42" which is the latch tested by millicode in the manner as will be explained in greater detail herein below.

Figure 5:
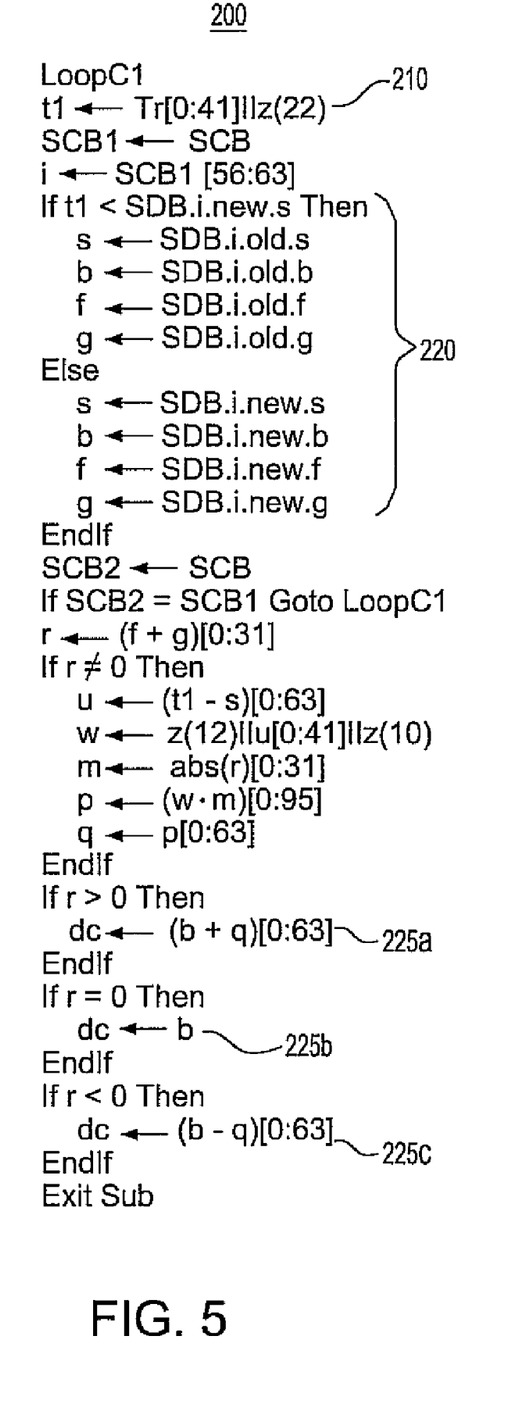
FIG. 5 is a Pseudo-Code depiction of a Compute Current Episode Parameters (ccep) subroutine 200.
Figure 7:
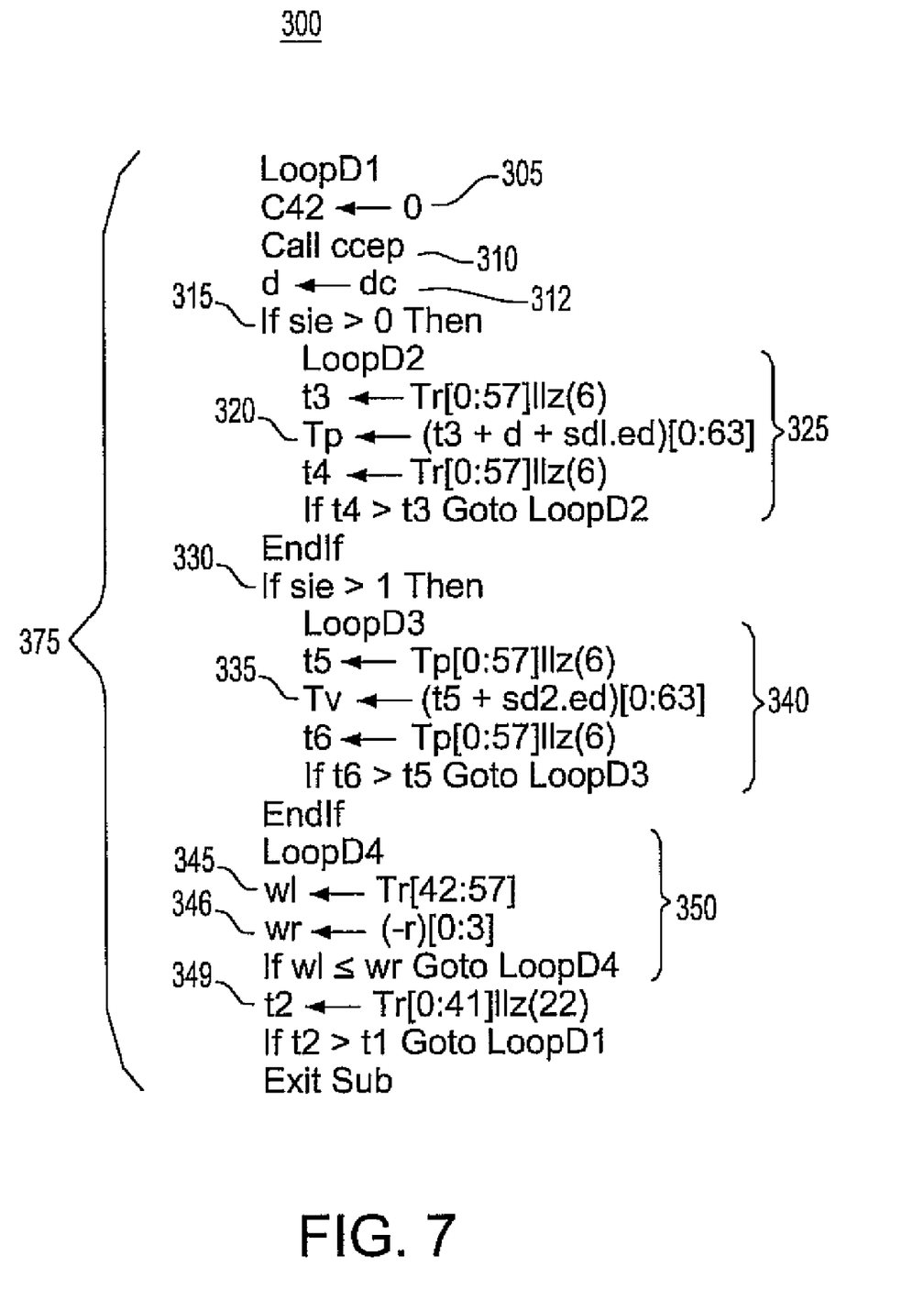

FIG. 5 is a pseudo-code depiction of a Compute Current Episode Parameters (ccep) subroutine 200 and FIG. 7 shows an illustrative pseudo-code depiction of a TOD-Offset-Update Event subroutine 300 indicating functions that are used to implement the invention, i.e., the action taken by every CPU in the configuration to update the TOD-Offset Register value. The example pseudo-code Subroutine to Compute Current Episode Parameters (ccep) subroutine 200 is called by the pseudo code 300 for the TOD-Offset-Update Event to compute and return the time at the most recent TOD-offset-update event (t1) and the offset (dc) for time t1. The subroutine also returns values of the current episode registers: current start time (s), current base offset (b), current fine-steering rate (f), current gross steering rate (g), and current total steering rate (r).

In the description of the sub-routines described herein, reference is made to the following Table 1 which illustrates symbols for hardware registers implemented in accordance with the invention, a sub-set of which are indicated in FIG. 1.

TABLE 1

| Name | Symbol For | | | |
|---|---|---|---|---|
| | HW | LPAR | G1 | G2 |
| Physical Clock | Tr | | | |
| TOD-Offset Register | d | | | |
| Logical TOD Clock | | Tb | Tp | Tv |
| Clock Comparator | CCr | CCb | CCp | CCv |
| CPU Timer | CTr | CTb | CTp | CTv |
| TOD-clock-sync control | | Yb | Yp | Yv |

In Table 1, the suffix letters r, b, p, and v stand for real, basic-rnachine, logical-partition (G1 or "Guest 1"), and virtual machine (G2 or "Guest 2"), respectively. Logical TOD clock register value Tb is not provided directly in the hardware, but is simulated. Clock comparator register CCb is maintained in the hardware storage area (HSA, See FIG. 1) and is simulated using CCr. CPU timers CTr and CTb implements the same register however both symbols are indicated for consistency with the other entries in the two columns depicted in Table 1. TOD-clock-sync-control register Yb, the basic-machine TOD-clock-sync control, controls the clock as observed by the program issuing a SET CLOCK (SCK) instruction. Thus, when the LPAR hypervisor issues SCK, Yb applies.

The following is a summary of other symbols used in describing the pseudocode routines described herein.

[ ] bit selection. For example, Tr[0:41] indicates that bits 0-41 of the physical clock are used;

abs(r) absolute value of r.

|| concatenation. For example, Tv[0:57]||pa6 indicates that 58 bits of the virtual-machine TOD clock are concatenated with a 6-bit processor address to form a 64-bit value;

0b111 A field of 3 one bits;

0b1111 A field of 4 one bits;

d TOD-Offset Register (implemented in each CPU);

op2 The second operand of SCK, STCK, STCKE, SCKC, STCKC, SPT, or STPT;

pa6 6-bit processor address;

pax 40-bit nonzero field containing processor address;

pr 16-bit right half of the basic-machine TOD programmable register;

r 32-bit signed binary integer indicating the current total steering rate;

SCB Steering-interface-control block. The SCB contains a 56-bit sequence count and an 8-bit index of the sanctioned SDB. This value is used as an update interlock for read-only routines. This value is for internal use only and is not surfaced to the program;

SCB1 The value of the SCB at the beginning of a pseudo-code routine;

SCB2 The value of the SCB at the end of a pseudo-code routine. (If SCB2≠SCB1, the pseudo code loops, as this indicates the steering parameters have changed during execution of the routine.);

SDB Steering-interface-data block. The contents of the SDB include old.s, old.b, old.f, old.g, new.s, new.b, new.f, and new.g;

SDB.i.x Field x in the SDB selected by the index value j; where j is the current value in the 8-bit index field of the SCB;

SDB.j.x Field x in the SDB selected by the index value j; where j is the 8-bit index value of a draft SDB. When the SDB is promoted from draft to sanctioned, the value j is placed in the 8-bit index field of the SCB;

t1 A 64-bit timestamp including the high-order bits (0:41 or 0:57) of the physical clock at the beginning of a pseudo-code routine;

t1 A 64-bit timestamp including the high-order bits (0:41 or 0:57) of the physical clock at the end of a pseudo-code routine. (If t2>t1, the pseudo code loops, as this indicates the routine did not finish in time.);

tcs A hypervisor logical time when a guest logical clock will start;

v41 A 64-bit value with a one in bit position 41; thus representing, in TOD clock format, the time value of a carry out of bit position 42; and, z(n) A field of n zero bits; for example, z(8) is an 8-bit field of zeros.

Pseudo-Code Subroutine for TOD-Offset-Update Event (todup):

Returning to FIG. 4, there is depicted the implementation details to update the TOD-offset register (d) for a respective CPU of the CPC. Each time a carry signal is detected as being propagated out of the first bit position, e.g., bit position 42, into the second bit position, e.g., bit position 41, of the physical clock (Tr), the latch C42 is set to one, and, before using any logical TOD clock value, the TOD-offset register is updated from the steering parameters in HSA. It is understood that the TOD-Offset-Update Event routine 300 depicted in FIG. 7 is called by many routines in the architecture depicted in FIG. 1. FIG. 7 particularly shows, in pseudo code, the action taken by every CPU in the configuration to update the TOD-offset register. First, as depicted at a step 305, the latch C42 is reset to zero, in preparation for the next carry. Then, as indicated at step 310, the pseudo code then calls the pseudocode subroutine compute current episode parameters (ccep) 200, described herein with respect to FIG. 5, that computes and returns the time at the most recent TOD-offset-update event (t1) and the current offset (dc) for time t1. The TOD-offset register (d) is then updated from the value of the current offset (dc) at step 312.

Next, as indicated at step 315, if the level of interpretive execution is one or two (sie>0), then the TOD clock for the first-level guest (G1), called the logical-partition TOD clock (Tp) is also updated. Bits 0-57 of the physical clock (Tr) with six zeros appended on the right are added to the TOD-offset register (d) and the TOD epoch difference in the guest 1 state description (sd1.ed) and bits 0-63 of the sum replace the contents of the logical-partition TOD clock (Tp) as indicated at step 320. Temporary variables t3 and t4 are used to verify that bits 0-57 of the physical clock (Tr) do not change during the update; if they do, the routine returns to label LoopD2 and repeats the function 325. As determined at step 330, if the level of interpretive execution is two (sie>1), then the TOD clock for the second-level guest (G2), called the virtual-machine TOD clock (Tv) is also updated. Bits 0-57 of the logical-partition TOD clock (Tp) with six zeros appended on the right are added to the TOD) epoch difference in the guest 2 state description (sd2.ed) and bits 0-63 of the sum replace the contents of the virtual-machine TOD clock (Tv) as indicated at step 335. Temporary variables t5 and t6 are used to verify that bits 0-57 of the logical-partition TOD clock (Tp) do not change during the update; if they do, the routine returns to label LoopD3 and repeats the function 340. Then, as indicated at step 345, the current value of bits 42-57 of the physical clock (Tr) are placed in a temporary variable (w1) which value represents the amount of time that has elapsed since latch C42 was turned on. At step 346, the negative value of the current total steering rate (r) is placed in a second temporary variable (wr) and that value is compared with w1 at step 349. If, at step 349, it is determined that w1≦wr, then the entire update process has taken less time than the amount subtracted from the TOD-offset register (d), e.g., at step 225c of FIG. 5. This test is to protect against the possibility that the current total steering rate (r) is negative and the entire update process has taken less time than the amount subtracted from TOD-offset register (d). To prevent the TOD clock from appearing to step backwards, the routine must loop by returning to label LoopD4 350 until this condition no longer exists. Finally, bits 0-41 of the physical clock (Tr) are placed in temporary variable t2. If the routine start time (t1) and the routine end time (t2) are different, then another carry has propagated out of bit position 42 into bit position 41 of the physical clock, and the routine must be repeated by going back to label LoopD1 375.

Pseudo-Code Subroutine to Compute Current Episode Parameters (ccep):

The "ccep" subroutine 200 called by the pseudo code 300 at step 310 for the TOD-offset-update event function is depicted in FIG. 5. The subroutine 300 computes and returns, at step 210, the time at the most recent TOD-offset-update event (t1). The subroutine also returns values of the current-episode registers: current start time (s), current base offset (b), current fine-steering rate (f), current gross-steering rate (g), and current total steering rate (r) as indicated at step 220. The subroutine additionally returns the offset (dc) for time t1 calculated at one of steps 225a, 225b and 225c depending upon the current-episode register values returned at step 220.

Pseudo-Code to Execute Store Clock Fast (STCKF):

The following pseudo code STCKF addresses the action when operating at the basic-machine level. It computes the value of bits 0-63 of the basic-machine TOD clock (Tb) by adding the contents of the TOD-offset register (d) to the current contents of the physical clock (Tr). Before completing the operation, the pseudo code below checks the latch C42. If C42 is set to one, then a carry out of bit 42 of the physical clock (Tr) has occurred and the contents of the TOD-offset register (d) may no longer be valid. In this case, the TOD-offset-update event (todup) subroutine is called to have the TOD-offset register (d) updated, and then the pseudo code loops back to the label Loop STCKF to restart the operation. When C42=0, the pseudo code places the value Tb in the second operand location (op2).

```
LoopSTCKF
Tb ← (Tr + d)[0:63]
If C42 = 1 Then
   Call todup
   Goto LoopSTCKF
```

```
-continued

EndIf
op2 ← Tb
```

Pseudo Code Subroutine for Get SDB (gsdb):

The Get SDB and Promote SDB subroutines are used as a pair by all routines having control functions that update the steering parameters, e.g., the PERFORM TIMING FACILITY FUNCTION (PTFF) control functions such as described in commonly-owned co-pending U.S. patent application Ser. No. 11/223,886, the contents and disclosure of which is incorporated by reference as if fully set forth herein, and, the SET CLOCK function. Get SDB is called at the beginning of the update and returns an SDB in the draft state which can then be updated in a non-atomic fashion. This subroutine locates a free SDB and changes it from the free state to the draft state. It returns the values SCB1 (the current value in the SCB) and SCB2 (the future value to be placed in the SCB at promotion). The rightmost 8 bits of these two values are i and j, the indexes of the sanctioned SDB and draft SDB, respectively.

```
j ← Index_of_Free_SDB
SDB.j.state ← draft
SCB1 ← SCB
i ← SCB1[56:63]
n1 ← SCB1[0:55]
n2 ← (n1+1)[0:55]
SCB2 ← n2∥j
Exit Sub
```

Figure 6:
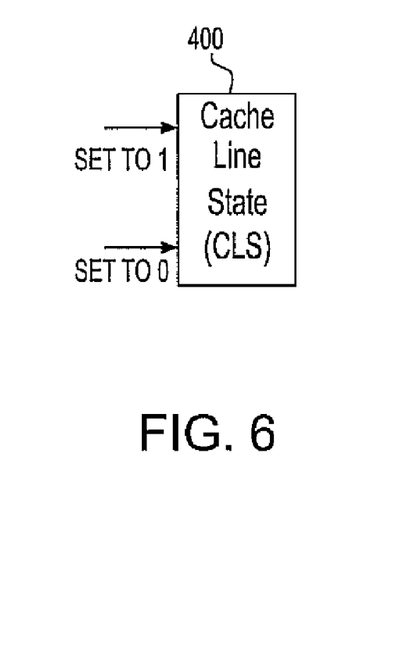
FIG. 6 represents a simplified view of the cache line state information maintained in the storage subsystem of system 10; and, FIG. 7 depicts, in pseudo code, a subroutine 300 performing the action taken on every CPU in the configuration to update the TOD-offset register in that CPU.

Pseudo-Code Subroutine Promote SDB (psdb):

The Get SDB and Promote SDB subroutines are used as a pair by all routines that update the steering parameters, e.g., all PTFF control functions such as described in commonly-owned co-pending U.S. patent application Ser. No. 11/223, 886, and the SET CLOCK routines. Promote SDB is called at the end of the update. Promote SDB indicates whether the request is successful or not by setting a return code ("rcode"). If successful, the draft SDB is promoted to the sanctioned state and the previously sanctioned SDB is placed in the free state. If not successful, the draft SDB is returned to the free state and the calling routine must start over again. This sub-routines using the arguments SCB1, and SCB2, attempts an atomic update of the SCB. The atomicity of the update is accomplished by means of the cache line state (CLS) 400, such as shown in FIG. 6, maintained in the storage subsystem. FIG. 6 represents a simplified view of the cache line state information maintained in the storage subsystem with three states being maintained, e.g., free, shared or exclusive. A cache line may be in one of three states: free not in use, shared (read only, in one or more processors), or exclusive (read write in only one processor). The CLS 400 being set to one represents the exclusive state. When a CPU requests exclusive ownership of a cache line, the storage subsystem grants that request only after ensuring that no other processor is using that line. Thus, the update process can safely update the SCB without any other CPU being able to access the cache line. Promotion is performed only if the latch C42 is zero and only if the SCB has not changed since Get SDB was issued.

The SCB1 and SCB2 arguments are the values previously returned by the Get SDB subroutine.

```
Lock SCB (CLS ← exclusive)
If(C42 = 0) AND (SCB = SCB1) Then
    SCB ← SCB2
    rcode ← promoted
Else
    rcode ← rejected
EndIf
UnLock SCB (CLS ← free)
If rcode = promoted Then
    SDB.j.state ← sanctioned
    SDB.i.state ← free
Else
    SDB.j.state ← free
EndIf
Exit Sub
```

Thus, as mentioned, in order to change the TOD-clock offset value (d), the millicode in the CPU performing the update must ensure that the cache line containing the offset is held exclusively by the CPU. For instance, there is the possibility that a carry may occur out of bit 42 into bit 41 of the slave clock during the update. If the cache line were not held exclusive, another CPU could fetch the old value after the carry and before the update. Thus, the state information maintained by the storage sub-system is checked to determine the exclusivity of the CPU in the first instance.

The present invention has been described with reference to diagrams of methods, apparatus (systems) and computer program products according to embodiments of the invention. It will be understood that each diagram, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

We claim:

1. An apparatus for adjusting a logical time of day (TOD)-clock for a computer system having multiple CPUs, each CPU having an associated physical clock providing a time base for executing operations that is stepping to a common oscillator, and an associated logical TOD clock, said apparatus comprising:
    means associated with a physical clock provided for a CPU in said computer system for detecting propagation of a carry at a pre-determined bit position of said physical clock;
    means, responsive to said detecting of a carry of a pre-determined bit position, for updating of a TOD-clock offset value (d) to be added to a physical clock value (Tr) value to obtain a logical TOD clock value (Tb) for use by a CPU in said system,
    wherein each CPU computes a new logical TOD clock value in synchronization, said new logical TOD clock value taking effect simultaneously for said multiple CPUs.

2. The TOD-clock adjusting apparatus as claimed in claim 1, wherein said means associated with a physical clock provided for a CPU in said computer system for detecting a carry comprises a latch device, said latch device being set in response to said carry of a pre-determined bit position of said physical clock.

3. The TOD-clock adjusting apparatus as claimed in claim 2, wherein said means for updating of a TOD-clock offset value (d) comprises: means for re-setting said latch device in preparation for a next pre-determined bit position carry.

4. The TOD-clock adjusting apparatus as claimed in claim 1, wherein said means for updating of a TOD-clock offset value (d) further comprises:
    means for computing current episode values including a current total TOD clock steering rate (r) and, providing the time at the most recent TOD-offset-update event (t1) and the current offset value for said time t1 which current offset value is used to update the TOD-offset register (d).

5. The TOD-clock adjusting apparatus as claimed in claim 4, further comprising:
    shared storage means accessible by each said CPU of said system, said means including a storage location for storing steering parameters, wherein a CPU accesses said storage location for computing said current episode values.

6. The TOD-clock adjusting apparatus as claimed in claim 5, wherein a CPU is enabled to atomically update steering parameters stored at said storage location, said apparatus further comprising:
    means for ensuring that a CPU has exclusive ownership of said storage location prior to initiating and atomic update of said steering parameters stored thereat.

7. The TOD-clock adjusting apparatus as claimed in claim 6, wherein said storage location comprises a cache line in a shared memory storage device, said means for ensuring exclusive CPU ownership of said storage location includes a device for indicating state of said cache line.

8. The TOD-clock adjusting apparatus as claimed in claim 7, wherein said cache line state comprises one of: a free state where said cache line is not in use by any other CPU, a shared state where one or more CPUs enjoys read only access, or an exclusive state where only one CPU enjoys read and write access.

9. The TOD-clock adjusting apparatus as claimed in claim 4, wherein said means for updating of a TOD-clock offset value (d) further comprises:
    means for tracking the time elapsed (w1) since said latch device was set; and,
    means for comparing a negative value (wr) of said current total TOD clock steering rate (r) against said elapsed time value w1; and, means for delaying time elapsed for said TOD-clock offset adjust process to prevent said appearance of said logical TOD clock stepping backwards when $w1 \leq wr$.

10. The TOD-clock adjusting apparatus as claimed in claim 9, whereby the logical TOD clock value change id monotonically increasing, said delaying means enabling a CPU to delay use of said new logical TOD clock value by at least the amount of said negative value.

11. The TOD-clock adjusting apparatus as claimed in claim 9, further comprising: means for avoiding a further carry propagating at said predetermined bit position of said physical clock in the time it takes to atomically update said TOD-clock offset value (d) stored at said storage location.

12. A method for adjusting a logical time of day (TOD)-clock for a computer system having multiple CPUs, each CPU having an associated physical clock providing a time base for executing operations that is stepping to a common oscillator, and an associated logical TOD clock, said method comprising:
detecting propagation of a carry at a pre-determined bit position of said physical clock associated with a CPU in said computer system;
updating, in response to said detecting of said pre-determined bit position carry, a TOD-clock offset value (d) to be added to a physical clock value (Tr) value to obtain a logical TOD clock value (Tb) for use by a CPU in said system,
wherein each CPU computes a new logical TOD clock value in synchronization, said new logical TOD clock value taking effect simultaneously for said multiple CPUs.

13. The method as claimed in claim 12, wherein said detecting a carry comprises: setting a latch device associated with a physical clock of a CPU in said computer system, said latch device being set in response to said carry of a pre-determined bit position of said physical clock.

14. The method as claimed in claim 13, wherein said updating of a TOD-clock offset value (d) further comprises: re-setting said latch device in preparation for a next pre-determined bit position carry.

15. The method as claimed in claim 12, wherein said updating of a TOD-clock offset value (d) further comprises:
computing current episode values including a current total TOD clock steering rate (r); and,
providing the time at the most recent TOD-offset-update event (t1) and the current offset value for said time t1 which current offset value is used to update the TOD-offset register (d).

16. The method as claimed in claim 15, wherein each said CPU of said system is enabled access to a shared storage means, said storage means including a storage location for storing steering parameters, said updating comprising: enabling a CPU to access said storage location for computing said current episode values.

17. The method as claimed in claim 16, wherein a CPU is enabled to atomically update steering parameters stored at said storage location, said method further comprising:
ensuring a CPU has exclusive ownership of said storage location prior to initiating an atomic update of said steering parameters stored thereat.

18. The method as claimed in claim 17, wherein said storage location comprises a cache line in a shared memory storage device, said ensuring exclusive CPU ownership of said storage location comprising: maintaining a state of said cache line.

19. The method as claimed in claim 18, wherein said cache line state comprises one of: a free state where said cache line is not in use by any other CPU, a shared state where one or more CPUs enjoys read only access, or an exclusive state where only one CPU enjoys read and write access.

20. The method claimed in claim 15, wherein said updating of a TOD-clock offset value (d) further comprises:
tracking the time elapsed (w1) since said latch device was set; and,
comparing a negative value (wr) of said current total TOD clock steering rate (r) against said elapsed time value w1; and,
delaying time elapsed for said TOD-clock offset adjust process to prevent said appearance of said logical TOD clock stepping backwards when $w1 \leq wr$.

21. The method as claimed in claim 20, whereby the logical TOD clock value change is monotonically increasing, said CPU delaying use of said new logical TOD clock value by at least the amount of said negative value.

22. The method as claimed in claim 20, further comprising: avoiding a further carry propagating at said predetermined bit position of said physical clock in the time it takes to atomically update said TOD-clock offset value (d) stored at said storage location.

23. A program storage device readable by machine, tangibly embodying a program of instructions executable by the machine to perform method steps for adjusting a logical time of day (TOD)-clock for a computer system having multiple CPUs, each CPU having an associated physical clock providing a time base for executing operations that is stepping to a common oscillator, and an associated logical TOD clock, said method steps comprising:
detecting propagation of a carry at a pre-determined bit position of said physical clock associated with a CPU in said computer system;
updating, in response to said detecting of said pre-determined bit position carry, a TOD-clock offset value (d) to be added to a physical clock value (Tr) value to obtain a logical TOD clock value(Tb) for use by a CPU in said system,
wherein each CPU computes a new logical TOD clock value in synchronization, said new logical TOD clock value taking effect simultaneously for said multiple CPUs.

24. The program storage device according to claim 23, wherein said detecting a carry comprises:
setting a latch device associated with a physical clock of a CPU in said computer system, said latch device being set in response to said carry of a pre-determined bit position of said physical clock.

25. The program storage device as claimed in claim 24, wherein said updating of a TOD-clock offset value (d) further comprises: re-setting said latch device in preparation for next pre-determined bit position carry.

26. The program storage device as claimed in claim 23, wherein said updating of a TOD-clock offset value (d) further comprises:
computing current episode values including a current total TOD clock steering rate (r); and,
providing the time at the most recent TOD-offset-update event (t1) and the current offset value for said time t1 which current offset value is used to update the TOD-offset register (d).

27. The program storage device as claimed in claim 26, wherein each said CPU of said system is enabled access to a shared storage means, said storage means including a storage location for storing steering parameters, said updating comprising: enabling a CPU to access said storage location for computing said current episode values.

28. The program storage device as claimed in claim 27, wherein a CPU is enabled to atomically update steering parameters stored at said storage location, said method further comprising:
ensuring a CPU has exclusive ownership of said storage location prior to initiating an atomic update of said TOD-clock offset value (d) stored thereat.

29. The program storage device as claimed in claim 28, wherein said storage location comprises a cache line in a shared memory storage device, said ensuring exclusive CPU ownership of said storage location comprising: maintaining a state of said cache line.

30. The program storage device as claimed in claim 29, wherein said cache line state comprises one of: a free state where said cache line is not in use by any other CPU, a shared state where one or more CPUs enjoys read only access, or an exclusive state where only one CPU enjoys read and write access.

31. The program storage device as claimed in claim 26, wherein said updating of a TOD-clock offset value (d) further comprises:
tracking the time elapsed (w1) since said latch device was set; and
comparing a negative value (wr) of said current total TOD clock steering rate (r) against said elapsed time value w1; and,
delaying time elapsed for said TOD-clock offset adjust process to prevent said appearance of said logical TOD clock stepping backwards when $w1 \leq wr$.

32. The program storage device as claimed in claim 31, whereby the logical TOD clock value change is monotonically increasing, said CPU delaying use of said new logical TOD clock value by at least the amount of said negative value.

33. The program storage device as claimed in claim 31, further comprising: avoiding a further carry propagating at said predetermined bit position of said physical clock in the time it takes to atomically update said TOD-clock offset value (d) stored at said storage location.

* * * * *

UNITED STATES PATENT AND TRADEMARK OFFICE
CERTIFICATE OF CORRECTION

PATENT NO. : 7,617,410 B2
APPLICATION NO. : 11/532168
DATED : November 10, 2009
INVENTOR(S) : Check et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Nineteenth Day of October, 2010

David J. Kappos
*Director of the United States Patent and Trademark Office*